US012531369B2

(12) United States Patent
Eberhardt et al.

(10) Patent No.: US 12,531,369 B2
(45) Date of Patent: Jan. 20, 2026

(54) HIGH-VOLTAGE PLUG ASSEMBLY

(71) Applicant: KOSTAL Kontakt Systeme GmbH, Luedenscheid (DE)

(72) Inventors: Guido Eberhardt, Hagen (DE); Lechoslaw Schwarz, Wadersloh (DE); Michael Hasenbank, Dortmund (DE); Christian Trebehs, Hagen (DE)

(73) Assignee: KOSTAL Kontakt Systeme Gmbh & Co. KG, Luedenscheid (DE)

( * ) Notice: Subject to any disclaimer, the term of this patent is extended or adjusted under 35 U.S.C. 154(b) by 362 days.

(21) Appl. No.: 18/447,375

(22) Filed: Aug. 10, 2023

(65) Prior Publication Data

US 2023/0387628 A1 Nov. 30, 2023

Related U.S. Application Data

(63) Continuation of application No. PCT/EP2022/054335, filed on Feb. 22, 2022.

(30) Foreign Application Priority Data

Feb. 23, 2021 (DE) ..................... 10 2021 000 957.6

(51) Int. Cl.
*H01R 13/627* (2006.01)
*H01R 13/53* (2006.01)
*H01R 13/533* (2006.01)

(52) U.S. Cl.
CPC ......... *H01R 13/6273* (2013.01); *H01R 13/53* (2013.01); *H01R 13/533* (2013.01); *H01R 2201/26* (2013.01)

(58) Field of Classification Search
CPC .. H01R 13/6273; H01R 13/53; H01R 13/533; H01R 13/639; H01R 2201/26

(Continued)

(56) References Cited

U.S. PATENT DOCUMENTS 4,148,538 A * 4/1979 Rodondi ............ H01R 13/6278 439/347
4,269,075 A * 5/1981 Crist .................... B23Q 1/0063 285/305

(Continued)

FOREIGN PATENT DOCUMENTS

CN 112038837 A 12/2020
DE 102005029133 A1 12/2006

(Continued)

OTHER PUBLICATIONS

The International Bureau of Wipo, International Preliminary Report on Patentability for International Application No. PCT/EP2022/054335 issued Aug. 29, 2023.

(Continued)

*Primary Examiner* — Gary F Paumen
(74) *Attorney, Agent, or Firm* — Brooks Kushman P.C.

(57) ABSTRACT

A high-voltage plug assembly includes a stationary first plug and a second plug that is movable along a connecting direction of the plugs. The plugs have mutually complementary plug contact elements. The second plug further has connection lines connected to its plug contact elements. An outlet direction of the connection lines extends perpendicular to the connecting direction. The second plug further has a position-securing element (PSE) that is displaceable along a displacement direction perpendicular to the connecting direction and that mechanically locks the plugs together when the plugs are connected while the PSE is displaced to a slide position. The PSE includes pairs of pins whose longitudinal axes are oriented in the PSE displacement direction and which are situated in pairs one behind the other in the PSE displacement direction. In the slide position in which the plugs are locked together, the pins respectively engage recesses of the plugs.

15 Claims, 4 Drawing Sheets

(58) Field of Classification Search
USPC .................................................. 439/347, 357
See application file for complete search history.

(56) References Cited

U.S. PATENT DOCUMENTS

| | | | | |
|---|---|---|---|---|
| 6,375,486 | B1 * | 4/2002 | Yu ........................ | H01R 13/639<br>439/59 |
| 6,979,220 | B1 * | 12/2005 | Ray .................... | H01R 13/6392<br>439/346 |
| 9,960,538 | B2 | 5/2018 | Nagasaki et al. | |
| 11,699,877 | B2 | 7/2023 | Wolter et al. | |
| 2014/0017925 | A1 * | 1/2014 | Shiga ..................... | H01R 13/62<br>439/347 |
| 2015/0031228 | A1 * | 1/2015 | Oh ..................... | H01R 13/6275<br>439/347 |
| 2017/0005436 | A1 | 1/2017 | Gunreben et al. | |
| 2020/0153159 | A1 | 5/2020 | Gartenmaier | |
| 2020/0161795 | A1 | 5/2020 | Aoki | |

FOREIGN PATENT DOCUMENTS

| | | | |
|---|---|---|---|
| DE | 202018106428 | U1 | 5/2019 |
| EP | 0667655 | A2 | 8/1995 |

OTHER PUBLICATIONS

European Patent Office, International Search Report for International Application No. PCT/EP2022/054335, mailed Jun. 23, 2022.
German Patent and Trademark Office, German Search Report for German Patent Application No. DE 10 2021 000 957.6 dated Dec. 23, 2021.

* cited by examiner

HIGH-VOLTAGE PLUG ASSEMBLY

CROSS-REFERENCE TO RELATED APPLICATIONS

This application is a continuation of International Application No. PCT/EP2022/054335, published in German, with an international filing date of Feb. 22, 2022, which claims priority to DE 10 2021 000 957.6, filed Feb. 23, 2021, the disclosures of which are incorporated in their entirety by reference herein.

TECHNICAL FIELD

The present invention relates to a high-voltage plug assembly having a stationary first plug with a first plug housing and a movable second plug with a second plug housing, the first and second plugs having mutually complementary plug contact elements that are connectable to one another, the second plug further having connection lines that are connected to its contact elements, an outlet direction of the connection lines extending perpendicularly with respect to a connecting direction of the first and second plugs, and the second plug further having a position-securing element that is perpendicularly displaceable with respect to the connecting direction and that mechanically locks the first and second plugs together when the first and second plugs are joined in a slide position.

BACKGROUND

These types of high-voltage plug assemblies are provided in electric vehicles, for example, for connection to the traction battery. A second plug includes single-core, high-voltage lines which have a relatively large line cross section, depending on their intended purpose, and which therefore are relatively rigid and have a fairly high intrinsic weight over their length. In particular for a plug assembly designed as an angled plug this is problematic, as the intrinsic weight of the high-voltage lines and their leverage effect exert quite a large force on the interconnected plug housings, resulting in tilting of the connected plug contact elements when these forces are not suitably intercepted.

In addition, such high-voltage plug assemblies are particularly sensitive to vibration loads, such as those routinely occurring in vehicles. In the process, relative movements develop between the interconnected plugs which result in increased abrasive wear on the electrical plug contact elements.

A generic high-voltage plug assembly is known from German patent application DE 10 2018 009 478 A1 (corresponds to U.S. Pat. No. 11,699,877). In this plug assembly, one of the two plugs has a rotary lever on which a position-securing element is situated. When the rotary lever is turned, the rotary lever brings the two plugs together and actuates a slider. The slider due to its displacement brings about additional form-fit locking of the two plugs. However, the mechanism necessary for this purpose is relatively complex, and requires a plug with a rotary lever.

SUMMARY

An object is to provide a generic high-voltage plug assembly in a simple and cost-effective manner, in which the above-mentioned problems are eliminated or minimized.

In embodiments of the present invention, a high-voltage plug assembly includes a stationary first plug and a movable second plug. The first plug and the second plug include mutually complimentary plug contact elements. The second plug further includes connection lines. The direction of extension of the connection lines runs perpendicular to a connecting direction of the first plug and the and second plug. The second plug further includes a position-securing element. The position-securing element is shiftable (displaceable) perpendicularly with respect to the connecting direction and mechanically locks the first and second plugs together when the first and second plugs are joined in a slide position. The position securing element includes at least two pairs of pins. The longitudinal axes of the pins are oriented in the shifting (displacement) direction of the position-securing element. The pairs of pins are arranged one behind the other in the shifting (displacement) direction. In the slide position, the pins respectively engage in one recess in the first plug and in one recess in the second plug.

Embodiments of the present invention achieve the above object and/or other objects in that the position-securing element includes at least two pairs of pins, in which the longitudinal axes of the pins are oriented (aligned) in the displacement direction of the position-securing element, in which the pins are situated in pairs one behind the other in the displacement direction, and in the slide position in which the position-securing element locks the first plug and the second plug together, the pins respectively engage in one recess at the first plug and in one recess at the second plug.

Thus, appliable pins are provided between a first plug housing of the first plug and a second plug housing of the second plug, which additionally lock and stabilize the mechanical connection between the plug housings. In order to do without additional components for the pinning function, this function is achieved by means of the position-securing element. For this purpose, appropriate geometries are provided on the position-securing element and on the plug housings.

BRIEF DESCRIPTION OF THE DRAWINGS

Advantageous embodiments and refinements of a high-voltage plug assembly in accordance with the present invention are illustrated and explained in greater detail below with reference to the drawings, which include the following.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
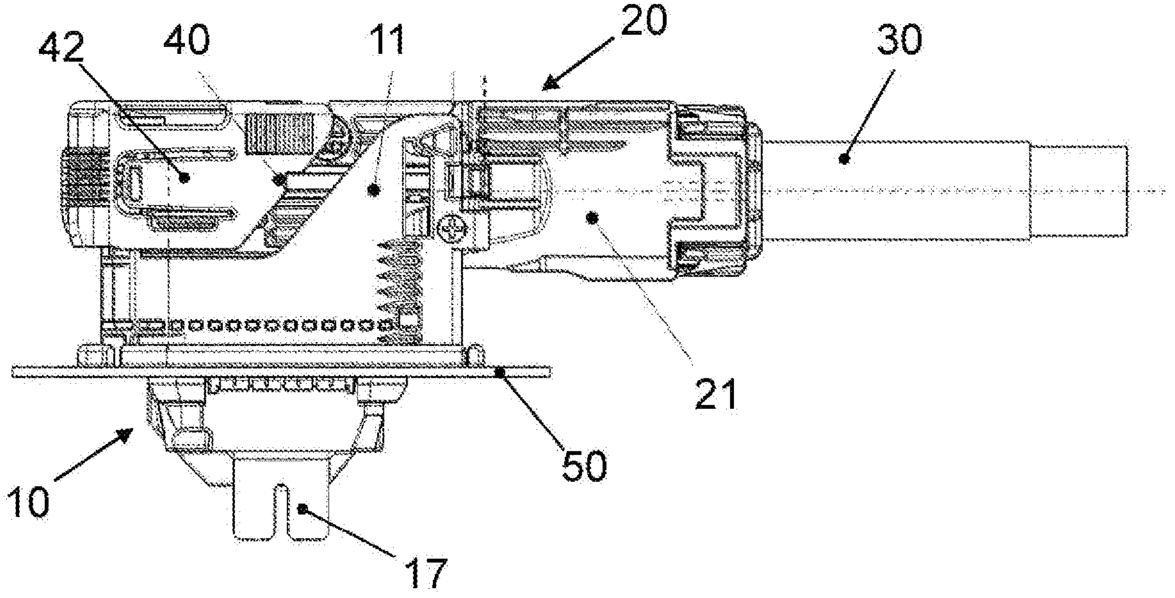
FIG. 1 illustrates an exemplary embodiment of a high-voltage plug assembly having a position-securing element, the position-securing element being in a pre-latching (pre-locked) position.
Figure 2:
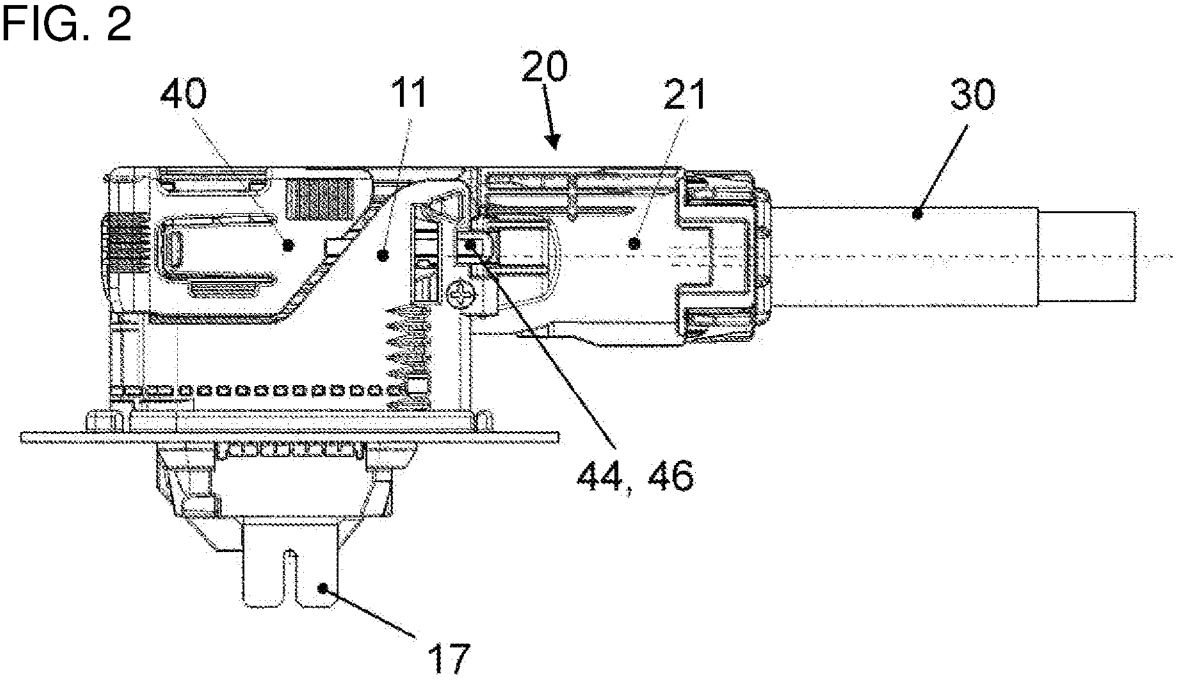
FIG. 2 illustrates the high-voltage plug assembly with the position-securing element being in a final latching (final locking) position.

FIGS. 1 and 2 illustrate a high-voltage plug assembly in accordance with an exemplary embodiment. The plug assembly may be used in an electric vehicle, for example. The plug assembly is made up of a first plug (or first connector) 10 and a second plug (or second connector) 20. First plug 10 is fixedly connected to a mounting surface 50. Hence, first plug 10 is a stationary first plug. Mounting surface 50, for example, may be part of the body of the electric vehicle. Second plug 20 is movable relative to first plug 10 along a connecting direction of the first plug and the second plug. Hence, second plug 20 is a movable second plug. Second plug 30 may be disconnected from first plug 10 and thus from the electric vehicle.

A first plug housing 11 is part of first plug 10. A second plug housing 21 is part of second plug 20.

Second plug 20 includes multiple connection lines 30. An outlet direction of connection lines 40 extends perpendicularly with respect to the connecting direction of plugs 10, 20.

First plug 10 includes electrical connections 17. Electrical connections 17 are guided through mounting surface 50 and whose outlet direction at first plug housing 11 extend downwardly and perpendicularly with respect to mounting surface 50, and thus at a right angle to the outlet direction of connection lines 30 of second plug 20. The plug assembly illustrated here is thus designed as an angled plug assembly.

The two plugs 10, 20 have pin-like and socket-like contact elements which are internally complementary to one another. Each contact element may be designed as a flat plug or round plug. FIGS. 1 and 2 illustrate first and second plugs 10, 20 already in the joined-together state in which the mutually complementary plug contact elements of the first and second plugs (not shown here as individual parts) are already connected to one another.

In the installed state illustrated in FIG. 1, the two joined-together plugs 10, 20 are not yet sufficiently secured against loosening of the plug connection, and instead are fastened solely via a detent hook (not shown) that is situated at second plug 20 and that defines a final latching position. To allow robust securing, a position-securing element 40 is displaceably situated at second plug Position-securing element 40 establishes a form-fit connection to first plug 10 in one (i.e., "the slide position" or "the displacement position") of at least two possible slide positions. Generic position-securing elements are known and are often referred to as connector position assurance (CPA) elements.

Position-securing element 40 may preferably be moved between two latching positions, which are defined by detent springs 42 at position-securing element 40 and which may engage at second plug 20.

High-voltage plug assemblies for electric vehicles generally conduct relatively high voltages and currents. In order to address these circumstances, connection lines 30, which are connected to second plug 20, have a relatively large conductor cross section and comparatively thick insulation sheathing. As a result, connection lines 30 are quite heavy and, in particular for the angled plug design described here, exert a considerable leverage effect on the interconnected plugs 10, 20.

In addition, vibrational effects that occur in a vehicle result in significant frictional loads on the electrical plug contact elements of plugs 10, 20, and on the plastic parts of plug housings 11, 21.

To minimize these loads, it is advantageous to connect the two plug housings 11, 21 to one another in the most stable manner possible. This is achieved, in accordance with the present invention, by position-securing element 40. Position-securing element 40 is illustrated as an individual part in FIGS. 3 and 4.

Figure 3:
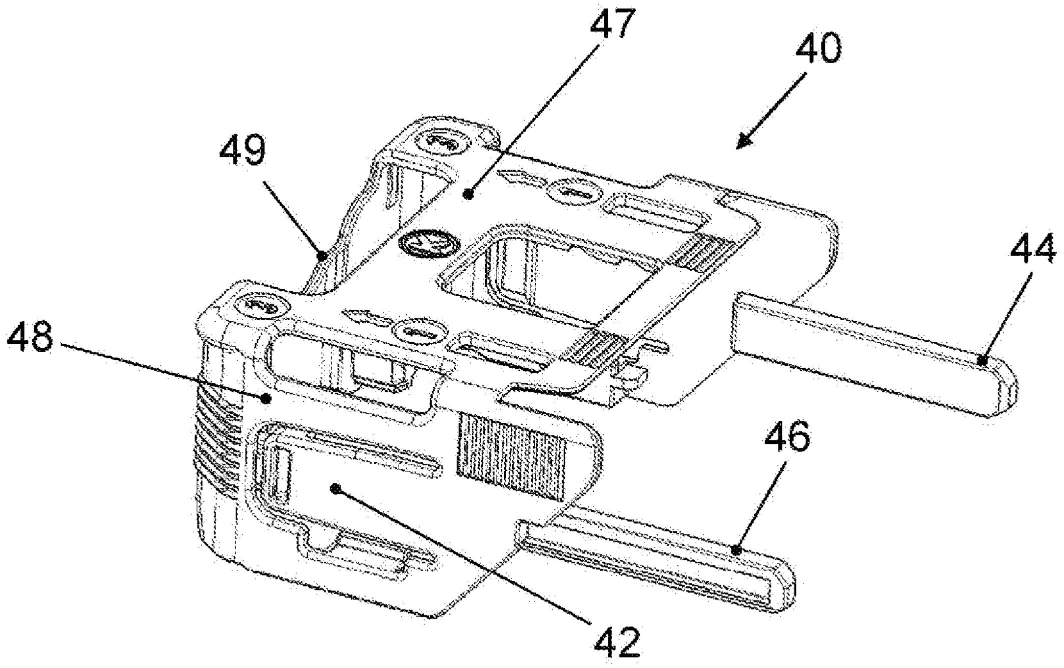
FIG. 3 illustrates the position-securing element in an isometric view.

FIG. 3 illustrates position-securing element 40 as a box-like component having a design that is open at a front side and a bottom side. Position-securing element 40 includes a top side 47 whose inner surface in the installed state displaceably rests on second plug 20. Position-securing element 40 further includes two side parts 48 which are connected as one piece to top side 47. Each side part 48 has a molded-in detent spring 42. Detent springs 42 can latch with first plug housing 11 in at least two slide positions of position-securing element 40.

A rear side 49 of position-securing element 40 is connected to top side 47 and to the two side parts 48. Rear-side 49 delimits possible displacement of position-securing element 40 in the outlet direction of connection line 30.

Position-securing element 40 includes pins 44, 46. Pins 44, 46 are connected to the two side parts 48. Pins 44, 46 at second plug 20 (see FIG. 2) extend in parallel to one another in the outlet direction of connection line 30. Pins 44, 46 are also referred to below as front pins 44, 46.

Figure 4:
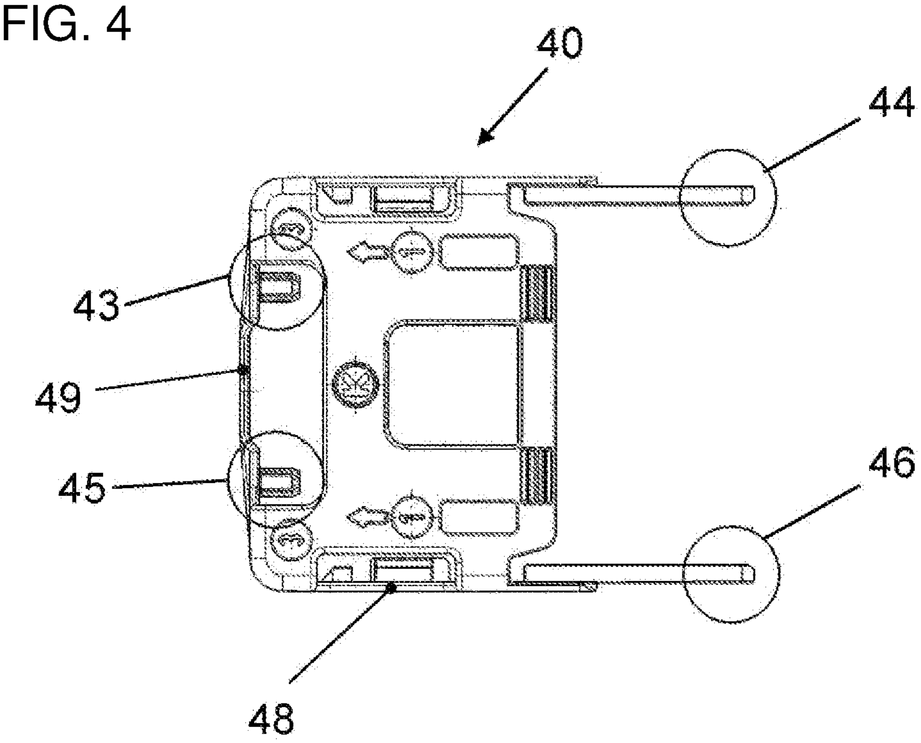
FIG. 4 illustrates the position-securing element in a view from above.

As shown in FIG. 4, position-securing element 40 further includes pins 43, 45. Pins 43, are connected to rear side 49 of position-securing element 40. For differentiation, pins 43, 45 are referred to below as rear pins 43, 45.

The two rear pins 43, 45 are each shorter than the two front pins 44, 46. The two rear pins 43, 45 are designed here as one-piece moldings at rear side 49 of position-securing element Front pins 44, 46 are integrally formed on side parts 48 of position-securing element 40. To achieve particularly high stability, front pins 44, 46 may advantageously be designed as metal pins.

According to the present invention, it is provided that position-securing element 40 has at least two pairs of pins 43, 44; 45, 46 whose longitudinal axes are oriented in the displacement direction of position-securing element 40, and which are arranged one behind the other in pairs with regard to the displacement direction of the position-securing element. In each case, one rear pin 43, 45 and one front pin 44, 46 together are regarded as a pin pair.

The front and rear pins 43, 44 or 45, 46, associated in pairs, are in each case arranged one behind the other in the displacement direction of position-securing element 40 and are oriented in parallel to one another, which, however, as shown in FIG. 4, does not necessarily require an assembly that is in flush alignment.

A double pair of pins 43, 44; 45, 46 as illustrated here is particularly advantageous, as mechanical stabilization may thus be symmetrically achieved at both longitudinal sides of the two plug housings 11, 21. However, it is also possible to provide a larger number of such pin pairs 43, 44 or 45, 46.

As previously mentioned, position-securing element 40 at second plug 20 may be brought into at least two displacement positions, which are illustrated in FIGS. 1 and 2. In FIG. 1, position-securing element 40 is in a pre-latching position with respect to plug housings 11, 21. In FIG. 2, position-securing element 40 has attained a final latching position ("the slide position" or "the displacement position").

With position-securing element 40 being in the pre-latching position, the two plug housings 11, 21 illustrated in the joined-together state may be easily separated from one another by forcefully pulling them apart opposite the connecting direction. With position-securing element 40 being in the final latching position, the two plug housings 11, 21 are connected to one another in a locked manner.

This action of position-securing element 40 is clarified with reference to FIGS. 5, 6, 7, and 8. Each of FIGS. 5, 6, 7, and 8 illustrates a cross-section of a partial piece of the interconnected plug housings 11, 21.

Figure 5:
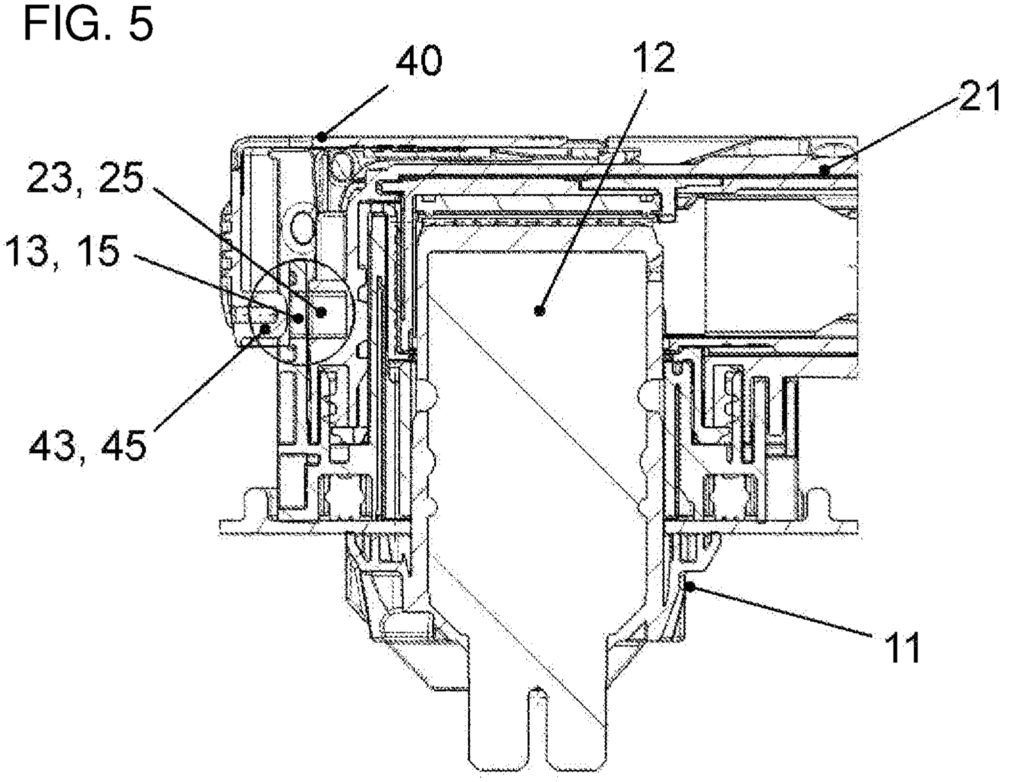
FIG. 5 illustrates a first sectional view of the high-voltage plug assembly with the position-securing element being in the pre-latching position.
Figure 6:
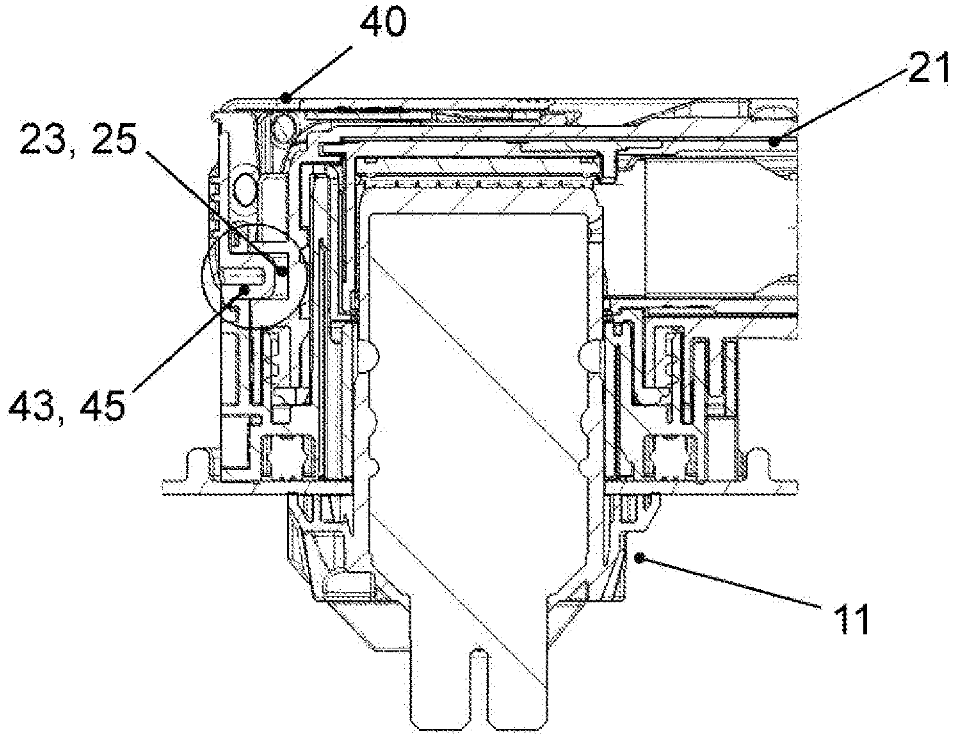
FIG. 6 illustrates a sectional view according to FIG. 5 with the position-securing element being in the final latching position.

FIGS. 5 and 6 each illustrate a vertical cross-section along one of rear pins 43, 45. In the illustrated section plane, a plug contact element 12 of first plug 10, which is part of first plug 10 and designed as a flat contact, is discernible.

In the pre-latching position illustrated in FIG. 5, rear pins 43, 45 integrally formed on position-securing element 40 are each situated directly in front of a recess 13, 15 in the wall of first plug housing 11. A recess 23, 25 is present in each case in a wall of second plug housing 21. Recesses 23, 25 of second plug housing 21 are directly behind and in alignment with recesses 13, of first plug housing 11, in each case. The cross-sectional shape and the cross-sectional size of pins 43, 45 and of recesses 13, 15, 23, 25 are adapted to one another, so that after position-securing element 40 is displaced into the final latching position (FIG. 6), pins 43, 45 engage in recesses 13, 23, 25 with minimal play. A first locking of first plug housing 11 with second plug housing 21 is thus established by engagement of the two pins 43, 45 in recesses 13 and 23 on the one hand, and in recesses 15 and 25 on the other hand.

Figure 7:
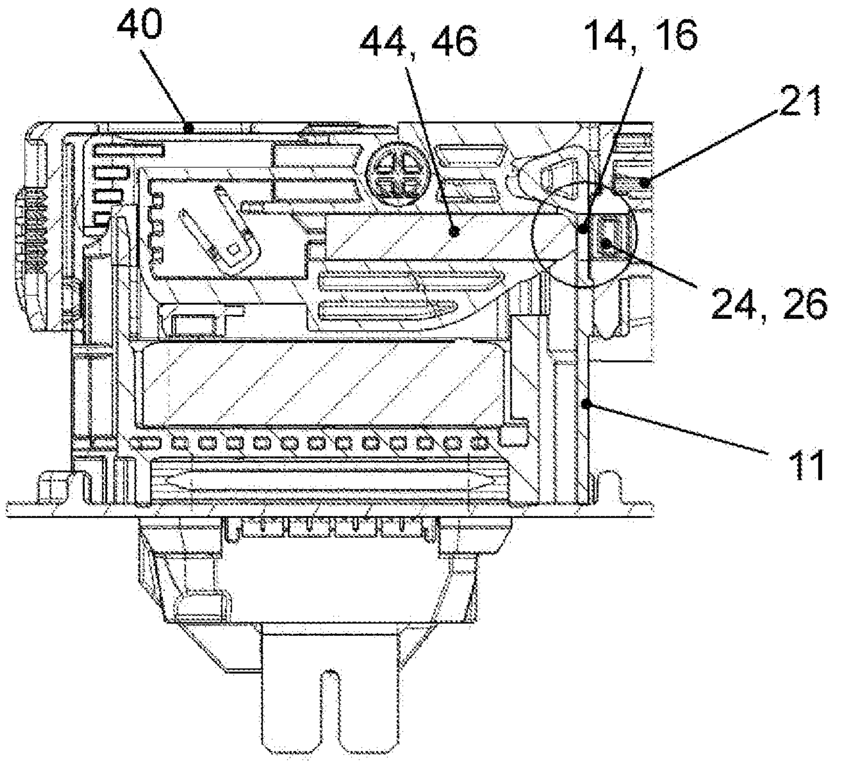
FIG. 7 illustrates a second sectional view of the high-voltage plug assembly with the position-securing element being in the pre-latching position.
Figure 8:
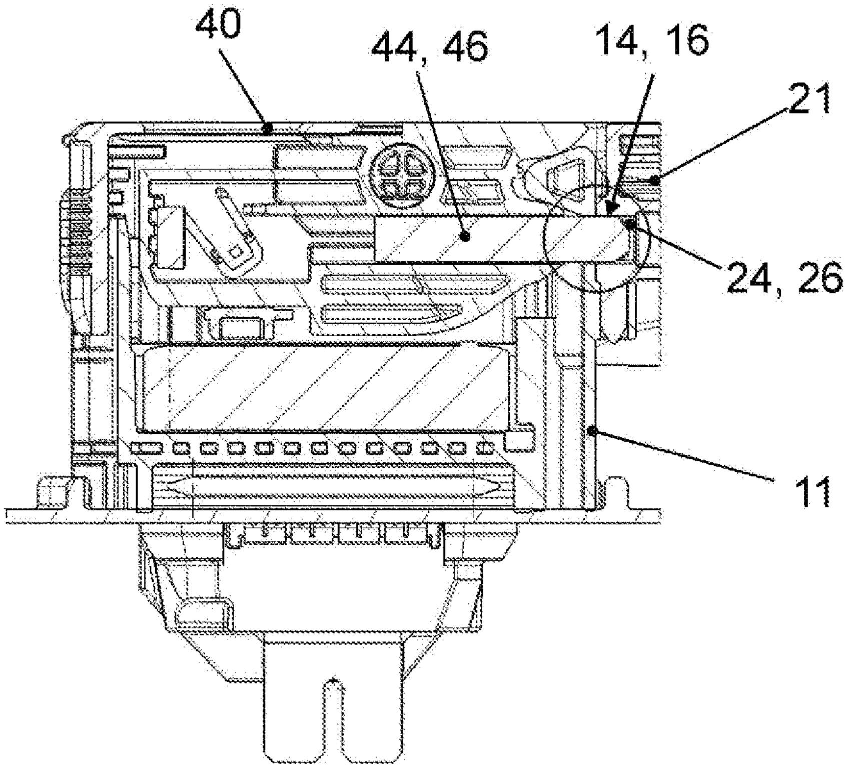
FIG. 8 illustrates a sectional view according to FIG. 7 with the position-securing element being in the final latching position.

Upon a displacement of position-securing element 40 from the pre-latching position into the final latching position, at the same time the two front pins 44, 46 are inserted into second recesses 14, 16 at first plug housing 11 and into second recesses 24, 26 at second plug housing 21. These second recesses 14, 16, discernible in cross section in FIGS. 7 and 8, are designed here in the form of eyelets that are integrally formed on the two longitudinal sides of first plug housing 11. After passing through the eyelets, front pins 44, 46 reach recesses 24, 26 that are integrally formed on second plug housing 21 and are stabilized therein.

Each of the four pins 43, 44, 45, 46 thus immerges through a respective recess 13, 14, 15, 16 of first plug housing 11 and through a respective recess 23, 24, 25, 26 of second plug housing 21.

With its front pins and rear pins 43, 44, 45, 46, position-securing element 40 thus locks the first and second plug housings 11, 21 at two respective, oppositely situated locations of the circumferential region of first plug housing 11, both of which lie along the outlet direction of connection lines 30.

Position-securing element 40 situated at second plug housing 21 thus creates stabilizing multiple locking between the two plug housings 11, 21 without increasing the installation effort during connection or disconnection of plugs 10, 20.

LIST OF REFERENCE NUMERALS

10 first plug (first connector)
11 (stationary) first plug housing (first connector housing)
12 plug contact element(s)
13, 14, 15, 16 recesses of first plug housing
17 electrical connections
20 (movable) second plug (second connector)
21 second plug housing (second connector housing)
23, 24, 25, 26 recesses of second plug housing
30 connection line(s)
40 position-securing element
42 detent spring(s)
43, 44, 45, 46 pins
47 top side of position-securing element
48 side parts of position-securing element
49 rear side of position-securing element
50 mounting surface While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A high-voltage plug assembly comprising:
a first plug with a first plug housing;
a second plug with a second plug housing;
the first plug and the second plug being movable with respect to one another along a connecting direction of the first and second plugs;
the second plug having a position-securing element, the position-securing element being displaceable along a displacement direction perpendicular to the connecting direction, the position-securing element mechanically locking the first and second plugs together when the first and second plugs are connected while the position-securing element is displaced to a slide position; and
wherein the position-securing element includes at least two pairs of pins whose longitudinal axes are oriented in the displacement direction of the position-securing element and which are situated in pairs one behind the other in the displacement direction of the position-securing element; and
in the slide position in which the position-securing element mechanically locks the first and second plugs together, the pins respectively engage recesses of the first plug housing and recesses of the second plug housing.

2. The high-voltage plug assembly of claim 1 wherein:
the position-securing element has exactly two pairs of pins.

3. A high-voltage plug assembly comprising:
a stationary first plug with a first plug housing;
a movable second plug with a second plug housing, the second plug being movable with respect to the first plug along a connecting direction of the first and second plugs;
the first plug and the second plug having mutually complementary plug contact elements that are connectable to one another;
the second plug further having connection lines that are connected to the plug contact elements of the second plug, an outlet direction of the connection lines extending perpendicularly with respect to the connecting direction of the first and second plugs;
the second plug further having a position-securing element, the position-securing element being displaceable along a displacement direction perpendicular to the connecting direction, the position-securing element mechanically locking the first and second plugs together when the first and second plugs are connected while the position-securing element is displaced to a slide position; and wherein the position-securing element includes at least two pairs of pins whose longitudinal axes are oriented in the displacement direction of the position-securing element and which are situated in pairs one behind the other in the displacement direction of the position-securing element; and in the slide position in which the position-securing element mechanically locks the first and second plugs together, the pins respectively engage in one recess of the first plug housing and in one recess of the second plug housing.

4. The high-voltage plug assembly of claim 3 wherein:

the position-securing element has exactly two pairs of pins.

5. The high-voltage plug assembly of claim 3 wherein:

the first plug includes electrical connections that are connected to the plug contact elements of the first plug, the electrical connections extending at a right angle to the outlet direction of the connection lines of the second plug.

6. The high-voltage plug assembly of claim 3 wherein:

the position-securing element is displaceable along the displacement direction between a pre-latching position and a final locking position, the pre-latching position corresponding to a position in which the second plug is movable along the connecting direction away from the first plug, and the final locking position corresponding to the slide position in which the position-securing element mechanically locks the first and second plugs together.

7. The high-voltage plug assembly of claim 6 wherein:

the position-securing element includes detent springs which engage with the second plug housing while the position-securing element is in either the pre-latching position or the final locking position.

8. The high-voltage plug assembly of claim 3 wherein:

the position-securing element includes a top side whose inner surface displaceably rests on the second plug housing.

9. The high-voltage plug assembly of claim 8 wherein:

the position-securing element further includes two side parts which are connected to the top side, each side part having a detent spring, the detent springs engage with the second plug housing while the position-securing element is in the slide position.

10. The high-voltage plug assembly of claim 9 wherein:

the position-securing element further includes a rear side which is connected to the top side and to the two side parts, the rear side delimiting displacement of the position-securing element in the outlet direction of the connection lines.

11. The high-voltage plug assembly of claim 10 wherein:

a first pair of the pins are formed on the rear side of the position-securing element and a second pair of pins are formed respectively on the side parts of the position-securing element.

12. The high-voltage plug assembly of claim 11 wherein:

the first pair of pins are shorter in length than the second pair of pins.

13. The high-voltage plug assembly of claim 3 wherein:

the pins of at least one of the pairs of pins are made of metal.

14. The high-voltage plug assembly of claim 13 wherein:

the plug housings are made of plastic.

15. The high-voltage plug assembly of claim 3 wherein:

in the slide position in which the position-securing element mechanically locks the first and second plugs together, the pins respectively engage in one recess of the first plug housing at a first location of a circumferential region of the first plug housing and in one recess of the second plug housing at an oppositely situated second location of the circumferential region of the first plug housing, the first location and the second location both lying along the outlet direction of the connection lines.

* * * * *